United States Patent
Johnston et al.

(10) Patent No.: US 12,087,287 B1
(45) Date of Patent: Sep. 10, 2024

(54) INDUCTION OF DIALOG FLOW WITHIN A CONVERSATIONAL NATURAL LANGUAGE SYSTEM

(71) Applicant: Interactions LLC, Franklin, MA (US)

(72) Inventors: Michael Johnston, New York, NY (US); Minhua Chen, New Providence, NJ (US); Seyed Eman Mahmoodi, Staten Island, NY (US); Badrinath Jayakumar, Millburn, NJ (US)

(73) Assignee: Interactions LLC, Franklin, MA (US)

( * ) Notice: Subject to any disclaimer, the term of this patent is extended or adjusted under 35 U.S.C. 154(b) by 51 days.

(21) Appl. No.: 17/235,804

(22) Filed: Apr. 20, 2021

(51) Int. Cl.
| | |
|---|---|
| G10L 15/22 | (2006.01) |
| G06F 3/16 | (2006.01) |
| G06F 40/279 | (2020.01) |
| G06F 40/35 | (2020.01) |
| G06T 11/20 | (2006.01) |
| G10L 15/18 | (2013.01) |
| G06F 40/30 | (2020.01) |
| G06N 3/044 | (2023.01) |
| G06N 3/0442 | (2023.01) |

(52) U.S. Cl.
CPC ......... *G10L 15/1815* (2013.01); *G06F 3/167* (2013.01); *G06F 40/279* (2020.01); *G06F 40/35* (2020.01); *G06T 11/206* (2013.01); *G10L 15/22* (2013.01); *G06F 40/30* (2020.01); *G06N 3/044* (2023.01); *G06N 3/0442* (2023.01); *G10L 15/1822* (2013.01)

(58) Field of Classification Search
None
See application file for complete search history.

(56) References Cited

U.S. PATENT DOCUMENTS

| | | | |
|---|---|---|---|
| 10,867,599 B2 * | 12/2020 | Rastogi | G10L 15/197 |
| 11,263,407 B1 * | 3/2022 | Jawale | G06F 40/268 |
| 11,442,992 B1 * | 9/2022 | Moon | G06F 16/90332 |
| 11,580,970 B2 * | 2/2023 | Shin | G10L 15/22 |

(Continued)

FOREIGN PATENT DOCUMENTS

KR   20210088463 A  *  6/2021

OTHER PUBLICATIONS

Fergadis et al., "Hierarchical bi-directional attention-based RNNs for supporting document classification on protein-protein interactions affected by genetic mutations", Database, 2018, 1-10. (Year: 2018).*

(Continued)

*Primary Examiner* — Richard Z Zhu
(74) *Attorney, Agent, or Firm* — Fenwick & West LLP

(57) ABSTRACT

Structure of conversations between users and agents and/or systems is discovered and interactively displayed to analysts, thereby better supporting development of automated conversation handling systems for different domains. A corpus of prior dialogs of users with agents (without pre-existing semantic labels indicating purposes for different parts of the dialogs) is taken as input, and embeddings are generated for textual units (e.g., rounds) of the dialogs. The (Continued)

embeddings are used to cluster the textual units, and the clusters and their relationships are visualized within a user interface that analysts may use to explore and fine-tune the structure of the conversations.

20 Claims, 8 Drawing Sheets

(56) References Cited

U.S. PATENT DOCUMENTS

| | | | | |
|---|---|---|---|---|
| 11,677,705 | B2* | 6/2023 | Conley | G06N 3/08 |
| | | | | 706/20 |
| 11,736,428 | B2* | 8/2023 | Conley | G06N 3/045 |
| | | | | 706/20 |
| 2017/0270929 | A1* | 9/2017 | Aleksic | G10L 15/22 |
| 2018/0047389 | A1* | 2/2018 | Song | G10L 15/16 |
| 2020/0019610 | A1* | 1/2020 | Agarwal | G06N 3/084 |
| 2020/0143247 | A1* | 5/2020 | Jonnalagadda | G06N 3/044 |
| 2020/0321002 | A1* | 10/2020 | Shin | G06N 3/044 |
| 2020/0344193 | A1* | 10/2020 | Conley | G06N 3/044 |
| 2021/0056445 | A1* | 2/2021 | Wu | G06N 3/045 |
| 2021/0089900 | A1* | 3/2021 | He | G06N 3/045 |
| 2021/0157990 | A1* | 5/2021 | Lima | G06F 40/35 |
| 2022/0036884 | A1* | 2/2022 | Ramachandran | G06N 3/08 |
| 2022/0229993 | A1* | 7/2022 | Vu | G06F 40/40 |
| 2022/0284171 | A1* | 9/2022 | Laxman | G06F 40/117 |

OTHER PUBLICATIONS

Xie et al., "Dialgoue Breakdown detection using Hierarchical Bi-Directional LSTMs," Proceedings of the Dialog System Technology Challenges Workshop, Dec. 2017. (Year: 2017).*

Carmel, D. et al., "Enhancing Cluster Labeling Using Wikipedia," SIGIR'09, Jul. 2009, pp. 139-146.

Mehri, S. et al., "Pretraining Methods for Dialog Context Representation Learning," Proceedings of the 57th Annual Meeting of the Association for Computational Linguistics, Jul. 2019, pp. 3836-3845.

Melamud, O. et al., "context2vec: Learning Generic Context Embedding with Bidirectional LSTM," Proceedings of the 20th SIGNLL conference on computational natural language learning, Aug. 2016, pp. 51-61.

Perkins, H. et al., "Dialog Intent Induction with Deep Multi-View Clustering," Proceedings of the 2019 Conference on Empirical Methods in Natural Language Processing and the 9th International Joint Conference on Natural Language Processing (EMNLP-IJCNLP), Nov. 2019, pp. 4016-4025.

Qiu, L. et al., "Structured Attention for Unsupervised Dialogue Structure Induction," Proceedings of the 2020 Conference on Empirical Methods in Natural Language Processing, Nov. 2020, pp. 1889-1899.

Schegloff, E. et al., "Opening up Closings," Semiotica 8(4), 1973, pp. 289-327.

* cited by examiner

INDUCTION OF DIALOG FLOW WITHIN A CONVERSATIONAL NATURAL LANGUAGE SYSTEM

FIELD OF ART

This disclosure relates generally to the field of natural language understanding systems, and more specifically, to the induction and visualization of the structures of different types of conversations between humans and systems or humans and other humans.

BACKGROUND

Understanding conversations between clients and organizations has shown tremendous value in supporting communication between companies and their customers. When conversations are designed correctly, they save money for the company and improve customer experience by enabling handling of common requests.

A key challenge today in the scoping, design, building, and maintenance of automated conversational systems is to predict the kinds of requests that customers will make and the appropriate handling that is needed. Often the planning and design of applications is a manual process in which the customers request support, and the stages involved in handling their requests are determined through a combination of interviews with contact center managers and other representatives of the company, manual recording, and examination of call, voice and chat log files.

For cases in which customer requests are handled by customer service representatives—over any communications means, such as telephony, voice, web, digital or textual means such as chat—collections of conversations with the customers, such as voice recordings or chat logs, are made available for later analysis. The most common process today is for these recordings to be brought into the design process through manual recording and (in the case of text chat) perusal of logs. The manual nature of this process limits the number of customer interactions that can be analyzed and has the potential to miss key patterns and insights.

SUMMARY

Unsupervised techniques that can automatically induce the structure of a dialog are coupled with an interactive graphical visualization that enables analysts and designers not only to explore a single dialog or a collection of dialogs, but to interact with and analyze all of the dialogs that are available. This solution to the problem presents a summary view of a large dialog collection as an interactive flow graph that reveals common patterns across multiple dialogs and allows the analysts to interactively refine the analysis and drill down to specific dialogs in order to aid in their interpretation of the dialog analysis. The summary view can also allow for contraction and expansion of sections of the dialog graph, further simplifying the process of identifying patterns within the dialog flow.

Unsupervised machine learning algorithms are used in order to infer the latent dialog states that underlie the surface form of the dialog. In the case of chat/text, these algorithms apply directly to the text representation of the dialog. In the case of voice, automated speech recognition is first applied in order to convert the audio to words. The dialog is first segmented into pairs of turns, the first turn being the agent contribution, and the second turn being the following customer contribution in response. These "adjacency pairs" are assigned to a set of latent dialog states in a two-step process. First, with respect to a self-supervised task, such as response selection or masked language modelling, a continuous multidimensional space (dialog embedding) is learned. Individual adjacency pairs (also referred to as "dialog rounds") are then partitioned into a set of clusters based on their position within the multi-dimensional space.

The output of the clustering is used to create an interactive visualization of the dialog corpus. A dialog flow graph is created which captures the paths among clusters that are found in the corpus. In some embodiments, this graph is annotated with indications (e.g., counts) of the frequency observed for each transition. The graph is presented dynamically, such that analysts can click on or otherwise select the graph to view the contents and characteristics of individual clusters and view the individual dialogs so as to see the surrounding context of each dialog round. The coupling of unsupervised techniques for clustering and graph formation with visualization for analysis and refinement by human analysts produces results that are both accurate and relatively rapid to derive.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
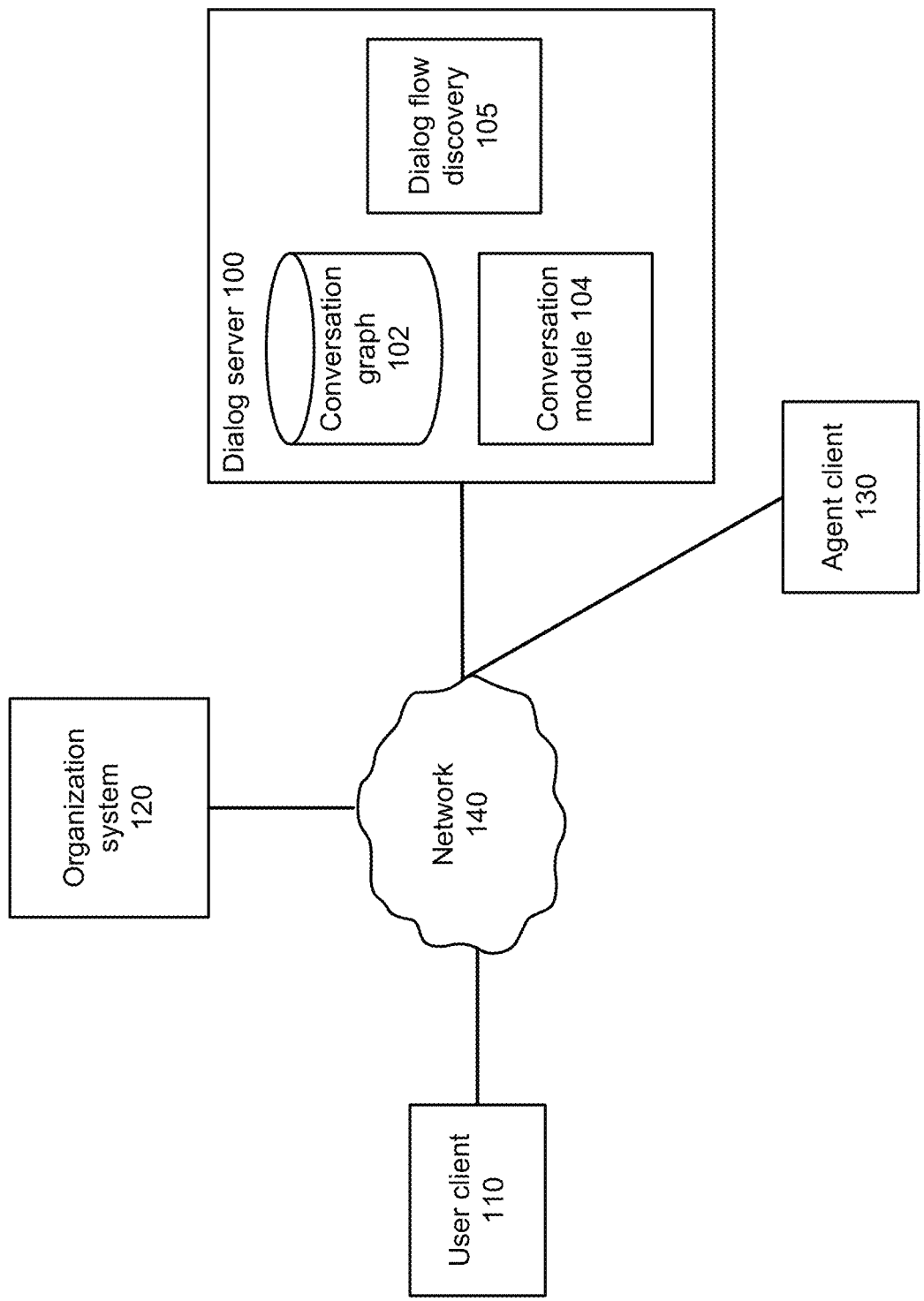
FIG. 1 illustrates an environment in which an organization (e.g., a business) uses a dialog server to handle its interactions with users (e.g., customers), according to one embodiment.

FIG. 1 illustrates an environment in which an organization (e.g., a business) uses a dialog server to handle its interactions with users (e.g., customers), according to one embodiment. An organization system 120 is visited by users using their user clients 110, e.g., for the purpose of asking questions, using functionality, or otherwise interacting with the organization system. As the users interact with the organization system 120—where the interaction mechanism could be as simple as a telephone switchboard or as complex as a digital virtual assistant-via chat, SMS, voice, etc., most organization systems 120 store the agent/client conversations, e.g., as voice recordings or as text logs. In some cases, the dialog server 100 may have difficulty in directly interpreting and responding to a user's conversation. In such cases, the dialog server 100 may delegate some or all of the conversation to a human agent by sending the conversation data to the agent's agent client 130, and the agent can then handle responses to the user on behalf of the dialog server 100.

Generally, the responsibility of interpreting and responding to user conversations can be apportioned between the conversation module 104 of the dialog server 100, and the human agents using the agent clients 130, in any appropriate manner; thus, conversations may be between a human user and an automated system, or between a human user and another human, or any combination thereof. The dialog server 100 may additionally have a dialog flow discovery module 105, which aids in identifying the structures of different possible conversations with users; in other embodiments, the dialog flow discovery module 105 executes on a system different from the dialog server 100 itself, and only its results are provided to the dialog server 100. These various components are now described in additional detail.

In some embodiments, the dialog server 100 includes a conversation module 104 that handles conversations with users, e.g., when the conversations are delegated to the dialog server by the organization system 120. The conversation module 104 uses a conversation graph 102, which describes a set of conversation states and the transitions between them, to determine how to conduct the conversation. For example, the conversation graph 102 used when responding to users who are customers of an airline organization might specify that the initial conversation state should provide a greeting and inquire what the user wishes to do, that various user responses lead to states corresponding to booking a plane ticket, checking flight schedules, requesting a refund, and the like.

The dialog server 100 further includes a dialog flow discovery module 105 that analyzes prior conversations of users with the dialog server 100 and infers the various conversation paths that are possible within the conversations. The inferences of the dialog flow discovery module 105 are used to automatically or semi-automatically generate data for the conversation graph 102 so that the dialog server 100 can better provide automated support for similar conversations in the future. The dialog flow discovery module 105 is described below in greater detail with respect to FIG. 2.

The user clients 110 and agent clients 130 are computing devices such as smart phones, telephones, laptop computers, desktop computers, or any other device that can interact with a network 140.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The environment of FIG. 1 is one example of an environment in which the dialog flow discovery module 105 can be used. More generally, the dialog flow discovery module 105 accepts stored dialogs/conversations as input and analyzes that input to infer to the structure of conversations. That inferred structure can then be used by other (or the same) systems to aid an automated handling of conversations. The dialog flow discovery module 105 can thus be used within environments different from those of the example of FIG. 1, and need not be part of a dialog server 100. For example, in other embodiments, there need not be a dialog server 100; rather, there may instead just be some form of simple recording mechanism that saves the stored conversation that serve as the input to the dialog flow discovery module 105.

Figure 2:
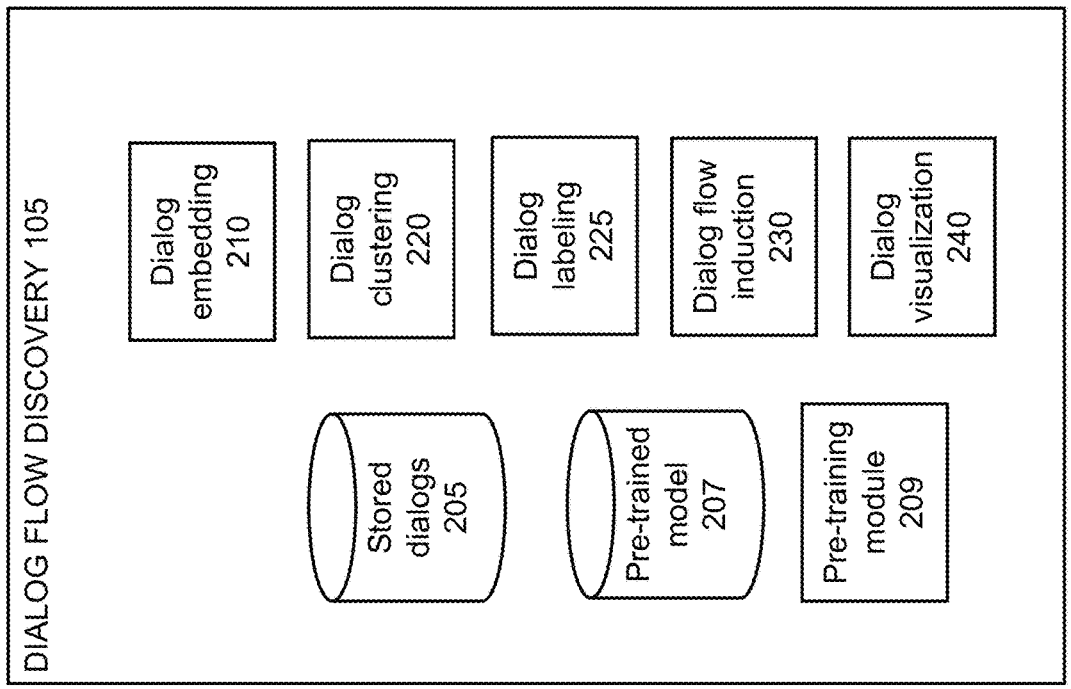
FIG. 2 illustrates components of the dialog flow discovery module of FIG. 1, according to some embodiments.

FIG. 2 illustrates components of the dialog flow discovery module 105 of FIG. 1, according to some embodiments. The dialog flow discovery module 105 analyzes data on prior conversations of users with the dialog server 100 (e.g., with the agents thereof) to infer the various states that are possible within such conversations, as well as the relationships of those states.

In the below discussion, the term "conversation" refers to the possible natural language interactions of a user with a system (e.g., the dialog server 100) within a particular domain. A particular sequence of interactions between a particular user and the system is referred to as a "dialog," and is made up of a sequence of pairs of prompts from the system followed by replies from the user; such pairs are referred to as "adjacency pairs" or (equivalently) "rounds." A "turn" is half a round—that is, either the prompt from the system or the reply from the user.

The dialog flow discovery module 105 stores, or has access to, stored dialogs 205, which contain the data describing the specific dialogs that users have previously had with the system in the past, whether in an automated manner via the conversation module 104, or in a manual manner via the agent clients 130, or a combination of both. For example, one stored dialog might be the sequence "Good morning! What would you like to do today?", "I want to book a flight", "OK, where would you like to fly to?", "Paris, France", "Got it. Where are you flying from?", "San Francisco", . . . "Anything else today?", "No, that's all", "OK, thank you and have a good day," where <"Good morning! What would you like to do today?", "I want to book a flight"> is one adjacency pair (or "round") of the stored dialog.

The dialog flow discovery module 105 includes a pre-trained model 207, which is used to generate embeddings for the rounds of dialogs. The training and use of the pre-trained model 207 are described in more detail below, e.g., with respect to the pre-training module 209.

The dialog flow discovery module 105 also includes a dialog embedding module 210, a dialog clustering module 220, a dialog flow induction module 230, and a dialog visualization module 240, which together infer and graphically present the possible states and state relationships for user-system interactions, given the prior dialogs from the stored dialog 205. The operations of the modules 210, 220, 230, 240 are illustrated with respect to the data flow of FIG. 3.

Figure 3:
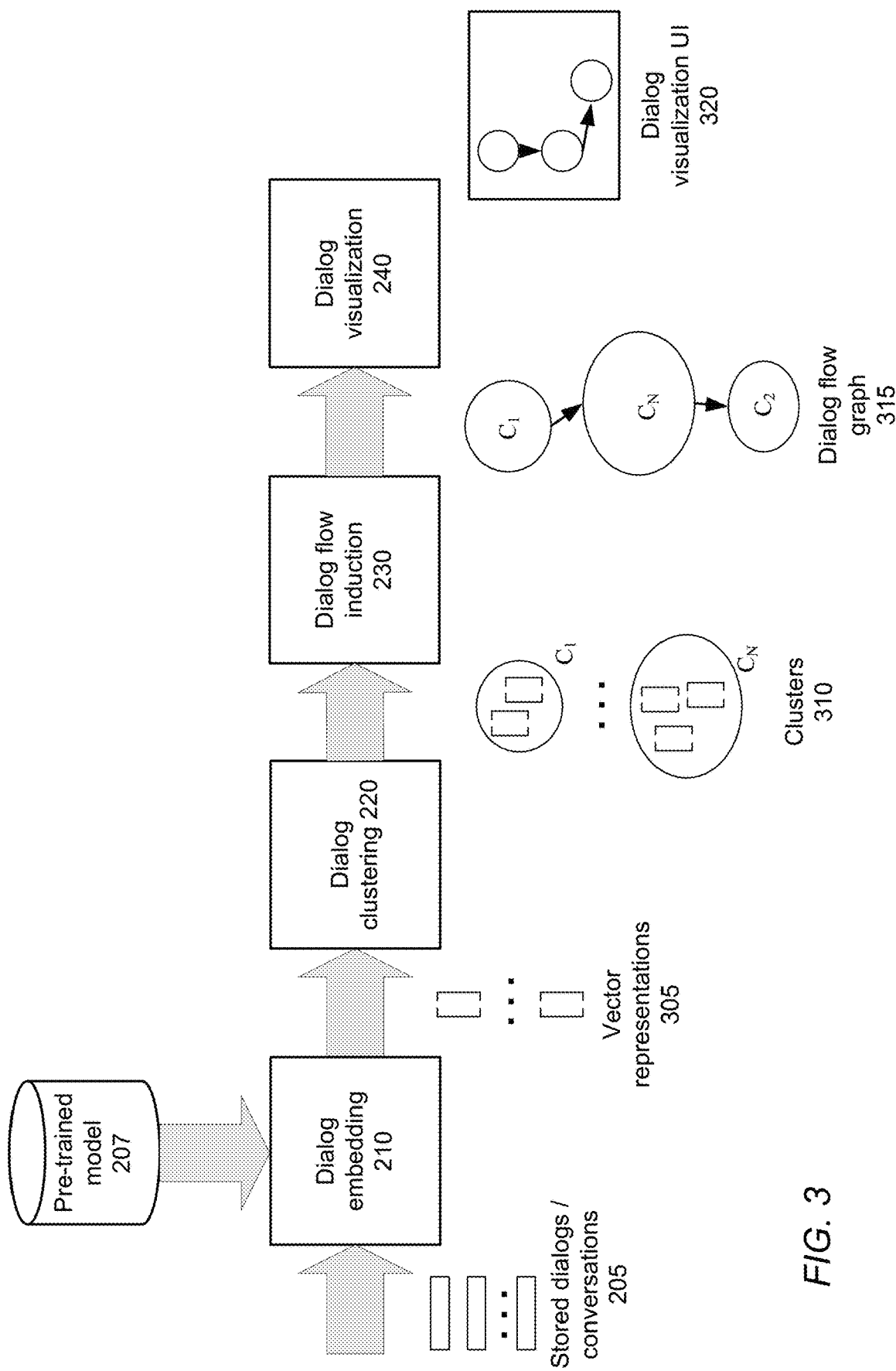
FIG. 3 illustrates the processing of the stored dialogs by the modules of FIG. 2, according to some embodiments.

FIG. 3 illustrates the processing of the stored dialogs 205 by the modules 210, 220, 230, 240 of FIG. 2, according to some embodiments.

The goal of dialog clustering is to infer the latent dialog states from unlabeled dialog data. To give a concrete example, consider the following dialog:

a Good morning! Can I have your phone number?. c 123-456-7890⇒GREETING a What can I do for you?. c Can I reset my password for my account?⇒SERVICE a Sure. Just give me one second. . c Take your time.⇒SERVICE a OK. Your new password is set. Anything else I can help with?. c That is all.⇒SERVICE a Thank you for calling us. Have a good day!. c Thank you. You too.⇒BYEBYE In this example, the dialog represents a prior conversation that took place between a human agent of the dialog server 100 (denoted "a" in the dialog) and a human user (denoted ".c") that is a customer of the organization on behalf of whom the dialog server is acting. This particular example dialog consists of five rounds, from "Good morning! . . ." (round one) to "Thank you for calling us. . . . " (round five). The all-capital term at the end of each round represents the semantic meaning (dialog state) of that round. (The data for attribution (.a or .c) and semantic meaning need not be stored as part of the dialog itself, but rather are shown here for purposes of example. The attribution data may be determined using speaker diarization techniques.)

Given such dialog text, the goal is to discover the underlying dialog state (the all-capital term at the end of each round above, such as "GREETING" or "SERVICE") associated with each round of dialogue. Since it would be difficult to infer the dialogue states based only on one dialog, a set (e.g., at least several thousand) of dialogs associated with a given organization is obtained from, and the latent dialogue states are inferred from the set. The primary challenge of state inference is that labeled data is not available (e.g., the dialog states above are not known initially, but rather must be inferred by the present techniques), and thus only the dialog text can be used. This is in contrast with the dialog act classification problem, in which a training set with dialog state labels is provided for supervised learning.

A two-step process is used for this unsupervised learning problem. First, the dialog embedding module 210 generates an utterance embedding vector for each of the textual units of the stored dialogs 205 via application of dialog pre-training on the in-domain data for the given organization. (In the remainder of this disclosure, the textual unit is described as being a single round of a dialog, though in other embodiments the textual unit could be different from a round, such as an utterance, a turn, two or more successive rounds, or the like.) Through this dialog pretraining, a round can be represented as a dense embedding vector, which compresses both the content of the conversation round and its dialog context. Second, the dialog clustering module 220 clusters the embeddings (e.g., using an algorithm such as K-means clustering or hidden Markov model (HMM)-based clustering) to obtain the dialog state associated with each round of dialog. Each such dialogue state (cluster) can additionally be labelled with keywords based on numerical statistics (e.g., Term Frequency-Inverse Document Frequency (TF-IDF)) computed for that cluster. Each of these steps is now described in more detail below.

Generating Embeddings

Pre-trained language models (e.g., ELMo, BERT, GPT-2, etc.) have prevailed in natural language processing in the recent years due to the success of the pre-training/fine-tuning paradigm they enable for many NLP tasks, including text classification, natural language inference, tagging, question answering, and the like. To solve the problem of dialog state inference, the dialog flow discovery module 105 adopts a different approach (named pre-training/clustering) in order to account for the special structure of dialog data and the unsupervised nature of the problem.

Figure 4:
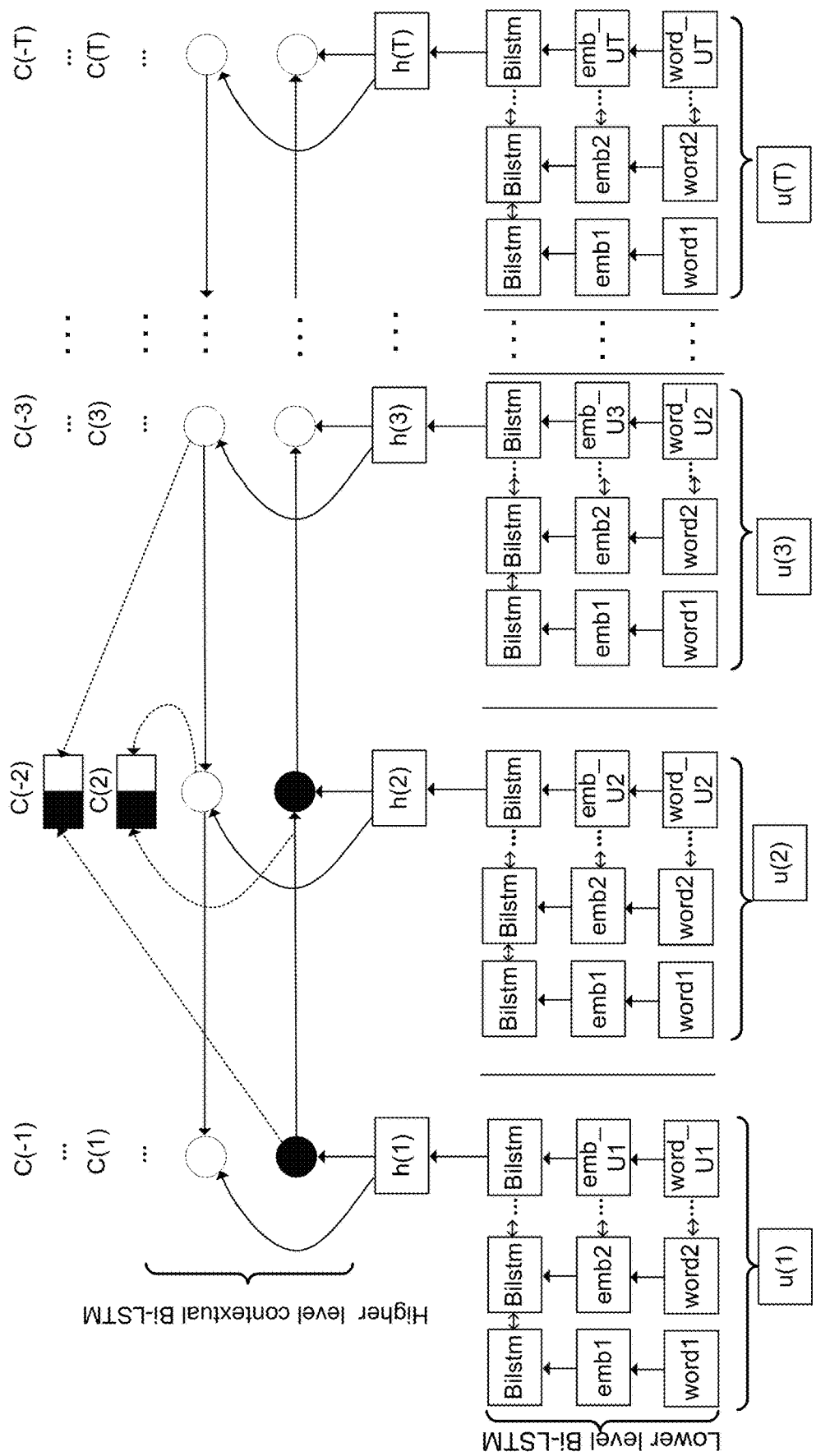
FIG. 4 illustrates the structure of a hierarchical Bi-LSTM representation of dialog rounds, according to some embodiments.

The dialog data of the stored dialogs 205 naturally reflect a hierarchical structure. A dialog is composed of a sequence of conversation rounds, and each round is again composed of a sequence of words. (See FIG. 4.) To leverage this hierarchical information in the pretraining process, the following dialog pretraining model structure is used. The dialog embedding module 210 first uses a Bi-LSTM (Bi-directional Long Short Term Memory) to encode each dialog round separately in order to obtain a dense vector representation. Notice that this representation alone cannot effectively be used for clustering, since it is context-independent. That is, since each round is encoded separately, without using any information of the dialog context before or after it, it is lacking in context. Accordingly, the dialog embedding module 210 further uses a higher-level Bi-LSTM at the dialog level, which takes the set of the above context-independent representation as input and generates a contextual embedding for each round of the dialog. (Note that in this embodiment, the lower-level and higher-level Bi-LSTM's together constitute the pre-trained model 207 that the dialog embedding module 210 applies to the stored dialogs 205 in FIG. 3, and are collectively referred to as a "hierarchical Bi-LSTM model.")

Pre-Training

In some embodiments, the dialog flow discovery module 102 includes a pre-training module 209 that generates the pre-trained model 207. For a problem such as dialog act classification, the representation generated by the dialog embedding module 210, and a label, could be used to determine the cross-entropy loss for training. However, in the present case of unsupervised dialog inference, such labels are not available. To address the lack of labels for training, self-supervised learning is used. Self-supervised learning is used is a sub-area of unsupervised learning, in which artificial tasks/labels (called pre-training tasks) are created from the data itself to facilitate training. It is desired that at the same time as the pre-trained model 207 is trying to solve these artificial tasks, the pre-trained model 207 also learns good representations of the data. The pre-trained model 207 and the representations can then be re-used in downstream tasks. One example of such tasks is the masked language model used in BERT (Bidirectional Encoder Representations from Transformers), which is a machine learning technique for natural language processing (NLP) pre-training, where some of the words are artificially masked in the sentence and the pre-trained model 207 attempts to determine what the masked words are.

Figure 5:
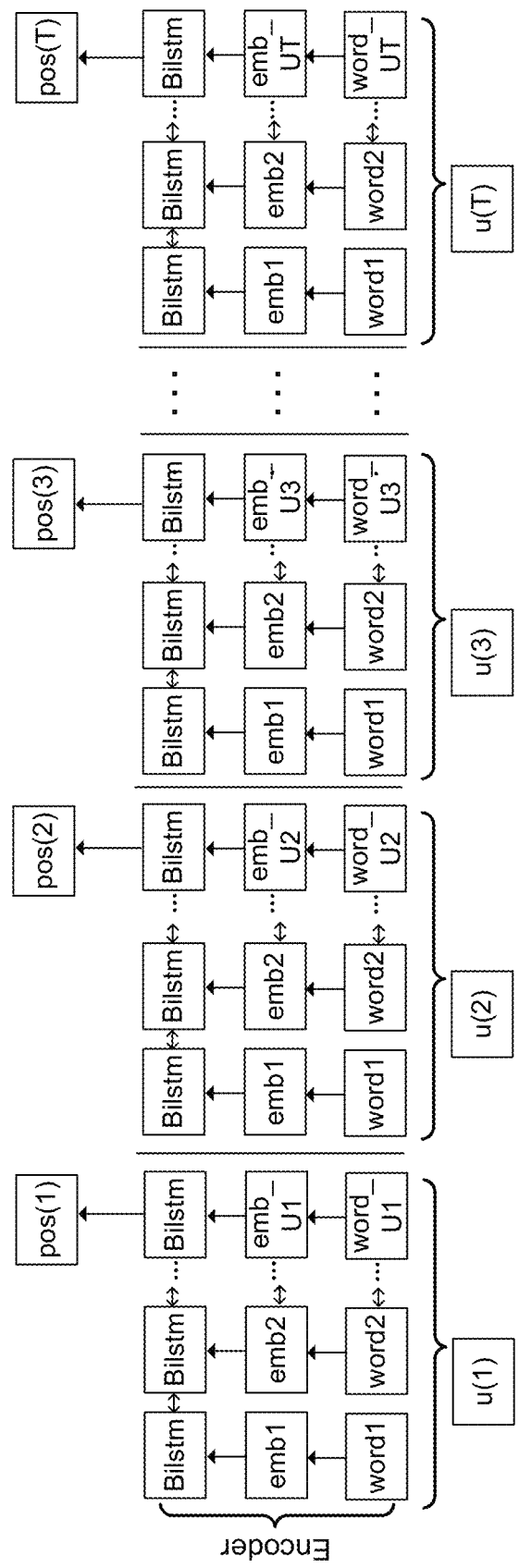
FIGS. 5 and 6 respectively illustrate treatment of dialog rounds as positive and negative examples for model training, according to some embodiments.
Figure 6:
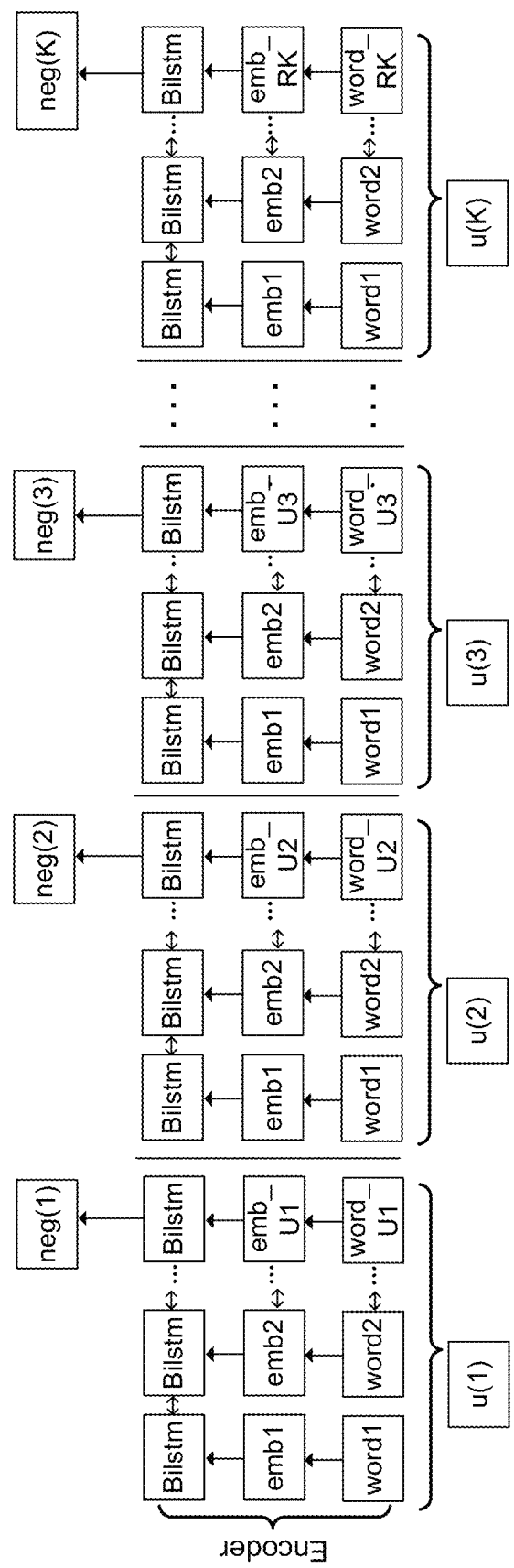

In some embodiments, the pre-training module 209 uses a pretext (pretraining) task called response selection to learn how to generate representations for the stored dialogs 205. Each round in the dialog is treated as a positive example (see FIG. 5), and at the same time a few negative examples are randomly sampled (see FIG. 6) from the corpus of stored dialogs 205. The examples are encoded with a third Bi-LSTM (referred to as the "response encoding Bi-LSTM"), and then the pre-trained model 207 is instructed to select the positive example from all the candidate examples, using the contextual representations from the higher-level Bi-LSTM discussed above. Through self-supervised training on this pretext task, the pre-trained model 207 is forced to learn what would be a proper response given the dialog context, hence fostering semantically meaningful representations from the Bi-LSTMs.

To describe the hierarchical Bi-LSTM model more precisely, assume that the $i^{th}$ dialog in the 107 contains T consecutive rounds of conversations: that is, $U(i)=[u(1), u(2), \ldots, u(T)]$, where $u(t)$ contains an <agent prompt, user response> pair between agent and user. For this $i^{th}$ dialogue, K rounds of conversations are also randomly sampled independently of the full dataset: that is, R(i)=[r(1), r(2), . . . , r(K)]. Notice that these K rounds of conversations (so-called negative examples) are not necessarily consecutive, and can come from different dialog, and there are different R(i) for each dialogue i. The hierarchical Bi-LSTM model can be expressed as follows:

| Lower-level Bi-LSTM: | h(t) = Lower( u(t) ) (t=1,2, ... , T) |
| Higher-level contextual Bi-LSTM: | [c(1), c(2), ... , c(T)] = Higher( h(1), h(2), ... , h(T) ) |
| Response encoding Bi-LSTM: | pos(t) = Encoder( u(t) )  (t=1,2, ... , T) |
|  | neg(k) = Encoder( r(k) )  (k=1,2, ... , K) |

To force the model to choose the positive example, the response selection loss for u(t) is expressed as:

$L(t)=-\log(\exp(<c(-t),pos(t)>)/(\exp(<c(-t),pos(t)>)+ sum\_k \exp(<c(-t),neg(k)>)))$ where c(−t) contains the part of c(t−1) from the left-to-right higher-level LSTM, and the part of c(t+1) from the right-to-left higher level LSTM. In this way, c(−t) will use only the left and right context of u(t) for response selection, but no information from u(t) itself. Also the < > operator denotes a simple vector inner product. As a side note, the last state represents the input for both the lower-level Bi-LSTM and the response encoding Bi-LSTM, although other pooling methods can be used as well. Since response selection is applied for each textual unit (e.g. round) of conversation in the dialog, the final loss function will be a summation of L(t) over t=1, 2, . . . T, and a summation over i for all dialogs.

Once the pre-trained model 207 (e.g., the hierarchical Bi-LSTM as described above) is trained, the contextual embedding c(t) is taken to represent u(t) and used for subsequent clustering operations.

In other embodiments, approaches other than the hierarchical Bi-LSTM described above are employed. For example, deep embedded clustering (DEC) may be used to cluster based on the surface form of the text in the clusters, without modeling context as done by the hierarchical Bi-LSTM. In this alternative approach, each dialog turn is treated independently as a pair of sentences, and hence the dialog context structure is ignored. The TF-IDF representation of the sentence is first projected into an embedding space, and then clustered through a student-t loss layer. The projection layer is initialized through an autoencoder model so that the clustering can start from a good embedding representation. As another example, large scale pre-trained models can be used, in which an entire dialog is treated as a single input unit, so that the dialog context is used in the pretraining process. A high-capacity model (such as Transformer in BERT or GPT-2) is adopted as the encoder, together with a masked language model loss or response selection loss. It is pre-trained first on large amounts of generic data (such as that from REDDIT) to learn generic language patterns, and then it is fine-tuned with the same loss function on the in-domain dialog data, in order to learn from contextual structure of the target domain, and obtain an embedding of each dialog turn for clustering. As yet another example, off-the-shelf pretrained embeddings such as word2vec or GloVe could be used, with pooling used over these to generate embeddings for dialog clustering. In this alternative approach, an embedding vector for each word is looked up in a pretrained word embedding table (like word2vec or GloVe). Then the word embeddings from one dialog round are pooled (e.g., through averaging) to obtain an embedding representation for that dialog round, so that clustering can be applied on those embedding vectors. However, since the word embedding table is pretrained on generic data such as that of WIKIPEDIA or GOOGLE NEWS, it does not learn from the domain-specific information in the target dialog data, nor does it leverage the dialog context in the embedding process.

Clustering

Following the above pre-training performed by the pre-training module 209, the dialog clustering module 220 uses the pre-trained model 207 to generate contextual embedding vectors. For example, in embodiments employing a hierarchical Bi-LSTM, the higher-level Bi-LSTM is used to generate the embeddings. The dialog clustering module 220 clusters the generated contextual embeddings (e.g., using a K-means clustering algorithm), and each of the resulting clusters represent one possible dialog state. The dialog state for a given round of a dialog corresponds to the cluster into which the round's contextual embedding was placed by the dialog clustering module 220.

Although the dialog embedding and dialog clustering operations are described above as involving a hierarchical Bi-LSTM encoding and K-means clustering, other pre-training and clustering approaches may alternatively be employed in other embodiments to achieve the same goal of dialog inference. For example, in other embodiments, Transformers could be used instead of the Bi-LSTMs encoders, or a single flat model could be used to encode the full dialog, rather than using the hierarchical model. Alternative clustering methods such as hierarchical agglomerative clustering, hidden Markov models (HMMs), or density-based spatial clustering of applications with noise (DBSCAN), could also be used. Additionally, in some embodiments a joint pre-training/clustering model is used, rather than employing two separate steps. As another variant, pretraining could initially be performed on generic (out of domain) dialogs, before focusing on the in-domain data of a specific organization 120. All these variants are possible within the general pretraining-clustering framework described above.

The pretraining-clustering approach is fully data-driven, relying only on the stored dialogs 205 data for performing dialog state discovery, rather than relying on manual labels or other ground truth. The inference of cluster category at the granular level of individual rounds (as opposed to entire dialogs) shapes the model architecture, pre-training tasks, procedure for inference, etc. The pretraining treatment of individual rounds as a target response for response selection greatly improves the efficiency of pretraining and avoids the need for masking within the model, given that using each round as a target response can generate the maximum number of training examples from each dialog, as opposed to randomly processing only a subset of the rounds.

Cluster Labeling

In order to obtain a more semantically-meaningful interpretation of the inferred clusters, each dialogue state cluster can be labeled with keywords (n-grams) obtained from textual statistics (e.g., term frequency-inverse document frequency (TF-IDF)) derived from the text of the rounds assigned to that cluster. In order to do so, a dialog labeling module 225 identifies representative terms within rounds in each cluster. The representative terms are a finite set of tokens (words) that represent a cluster. In one embodiment, for every round in the dialogues, the dialog labeling module partitions the round into an agent utterance and a user utterance. Then, for the agent's utterances, the dialog labeling module 225 vectorizes them using a TF-IDF vectorizer and multiplies the vectors with a one-hot representation of the cluster indices of the rounds in the dialogues. This produces agent-representative terms of cluster indices by picking the top N (e.g., N=3) terms (TF-IDF feature names). The same process is used for the user's utterances. This results in agent-representative terms and user-representative terms for every cluster index.

In other embodiments, a second, more memory-efficient technique is used for cluster labeling. The previously-described technique for cluster labeling vectorizes all rounds in dialogs, which could lead to out-of-memory errors when the number of rounds in all the dialogues is sufficiently large. In order to overcome this problem, the second cluster labeling technique extracts rounds belonging to each cluster index, and each round is split into an agent utterance and a user utterance. The agent's utterances in the cluster index are vectorized using a TF-IDF vectorizer, and the vectors are transposed. From the vectorized and transposed agent utterances, terms (TF-IDF feature names) having more than a certain number of occurrences (e.g., occurring at least N times in R rounds, such as occurring at least once in at least 3 rounds) are picked, and the vectors for the picked terms are selected from the vectorized and transposed agent utterances. In other words, the vectorized and transposed agent utterances are used for dual purposes: i) picking terms that occurred more than certain numbers of times and ii) selecting vectors for the picked terms. The centroid of those vectors is then calculated. Then, some number (e.g., three) of vectors that are closest to the centroid are identified, and the terms that correspond to those vectors form the agent-representative terms for the cluster index. Similarly, the same steps are performed for user utterances for that cluster. This same process is performed for every cluster to be labeled.

In alternative embodiments with cluster labeling, other algorithms such as identifying the most common noun chunks found across the dialogs in the cluster are used. In yet further embodiments with cluster labeling, a dependency parser is applied to the dialogs of the cluster and the most common verb-to-head noun dependencies are extracted (e.g., "pay—bill", "cancel—account", "order—pizza") and used as a label for the cluster. In yet another embodiment for cluster labeling, differential cluster labeling-which labels a cluster by analyzing terms across clusters using mutual information and chi-squared feature selection—is used.

Dialog Flow Induction

The output of the dialog clustering module 220 includes a set of clusters of dialog rounds. The dialog flow induction module 230 takes these clusters as input and generates a single flow graph 315 that summarizes the cluster patterns that are seen in the data. After dialog clustering, each individual dialog can be seen as a sequence of segments (e.g., rounds) belonging to specific clusters. For example, a dialog with a sequence of three rounds $<R_1, R_2, R_3>$ might correspond to the sequence of clusters $<C_7, C_1, C_4>$, that is, with $R_1$ having been clustered into $C_7$, $R_2$ into $C_1$, and $R_3$ into $C_4$. Each dialog is added to the graph in turn and the number of times a given transition between clusters is seen the data is tracked as a count or percentage associated with each arc in the flow graph 315. For example, if a given dialog has a transition from rounds respectively clustered into clusters $C_1$, $C_2$, and $C_4$, then the dialog flow induction module 230 ensures that cluster nodes $C_1$, $C_2$, and $C_4$ are in the flow graph 315, and increments an edge count for the edge from $C_1$ to $C_2$ and for the edge from $C_2$ to $C_4$.

In some embodiments, edges are pruned from (filtered out of) the flow graph 315 if they occur relatively infrequently, e.g., occur fewer than a threshold number of times across the stored dialogs 205. This functions to reduce noise in the resulting graph and thereby focus on the more important edges. In other embodiments, the pruning of edges is left to the dialog visualization component 240, and the analyst is able to manually specify the threshold to be used interactively using a graphical slider or other interface elements.

In addition to generating the flow graph 315, in some embodiments the dialog flow induction module 230 also generates data representations of whole individual dialogs annotated with dialog and utterance unique identifiers, cluster names or indexes, time span, speaker gender, speaker age, speaker emotion, and/or other metadata. In such embodiments, this metadata, along with the flow graph 315, is loaded by a dialog visualization module 240 (discussed below).

Dialog Visualization

The dialog visualization module 240 takes the flow graph 315 and any associated metadata generated by the dialog flow induction module 230 and generates a dialog visualization user interface 320. The dialog visualization user interface 320 is an interactive graphical tool that enables a human analyst to view the underlying structure that is inherent in a collection of dialogs, and furthermore to drill down into that structure, e.g., to view the contents of an individual cluster and from there to view examples of specific dialogs in which a dialog round from that cluster appears. In some embodiments, the dialog visualization user interface 315 allows for contraction and expansion of portions of the graph illustrated in the dialog visualization UI 320.

Figure 7:
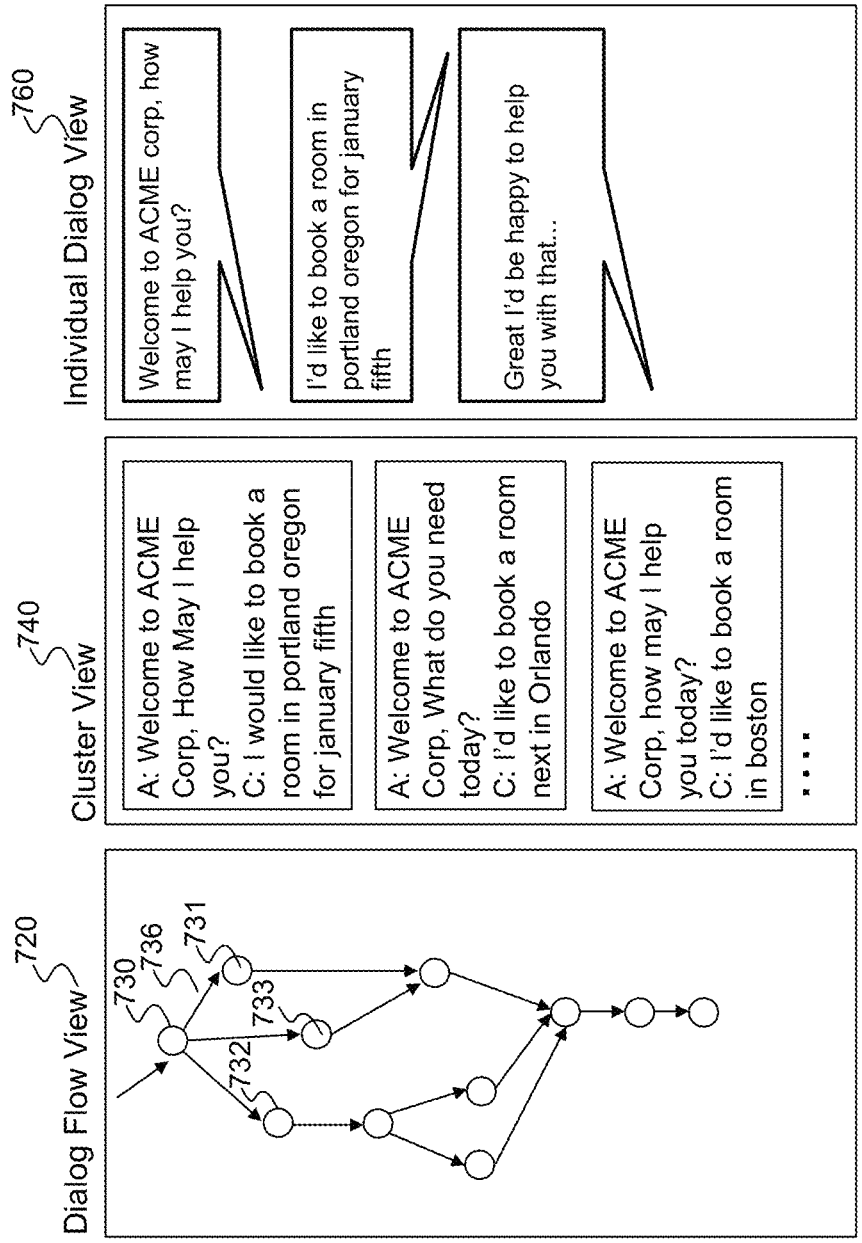
FIG. 7 illustrates a high-level schematic view of the main components of the dialog visualization UI of FIG. 3, according to some embodiments.

FIG. 7 illustrates a high-level schematic view of the main components of the dialog visualization UI 320, according to some embodiments. The dialog flow view 720 is a portion of the UI 320 (e.g., a canvas or pane) that provides a network representation of the dialog flow graph 315. The dialog flow view 720 is pannable and zoomable so the analyst viewing the UI 320 can focus in on parts of the graph 315. In some embodiments, the dialog graph is collapsible (allowing the analyst to gradually "unfold" the graph nodes of the view 720) and foldable (allowing several nodes to be "folded" up into a single composite node for visualization purposes). The edges in the graph can be visually annotated so as to indicate the importance of the edge (e.g. annotated with counts indicating the number of times the transition corresponding to that edge occurs in the stored dialogs 205). In some embodiments, the thickness of the arrows in the graph varies relatives to the frequency of the given transition. In some embodiments, the nodes in the graph are annotated with the cluster names determined by the dialog labeling module 225.

The graph displayed in the dialog flow view 720 is interactive. When one of the nodes in the dialog flow view 720 is clicked or otherwise selected, the cluster view 740 (the middle panel in the UI 320) shows a scrollable list of cluster members (e.g., rounds of agent prompts/user answers), e.g., displayed in order of their score (quantifying closeness to the center of cluster). This allows the analyst to inspect the contents of a cluster and determine/verify the function of that cluster in the dialog (e.g. order capture, vs. payment, vs. capture phone number).

The cluster view 740 is also interactive. When the analyst clicks on or otherwise selects a cluster member in the cluster view 740, the individual dialog view 760 (the third panel in the UI 320) displays the complete dialog that a particular round in the cluster view is from. For example, in the example of FIG. 7, the analyst has selected the first round in the cluster view 740, and accordingly the individual dialog view 760 displays the entire dialog from which that round came. In some embodiments, the rounds in the cluster are highlighted and/or the individual dialog view 760 scrolls to the position in the dialog of the round selected in the cluster view 740.

The data can be visualized in different manners in different embodiments of the dialog visualization 240. For example, the data could be visualized as an expandable tree and/or explored interactively with the human analyst picking a path through graph in the dialog visualization UI 320 that expands to show next possible steps as the analyst selects a path.

The dialog flow graph 315 as presented in the dialog visualization UI 320 acts as a basis for updating or adding to the conversation graph 102 that the conversation module 104 uses to automatically conduct user conversations. In some embodiments, the analyst can modify the displayed dialog flow graph 315 by graphically manipulating it within the dialog visualization UI 320 after studying its structure and constituent parts, e.g., by splitting apart a single cluster into two different clusters representing two different concepts, by merging multiple clusters for related concepts into a single cluster, or the like. The dialog flow graph 315 (whether or not modified by the analyst) can then be merged into the conversation graph 102, thereby widening the scope of conversational competence of the dialog server 100.

Figure 8:
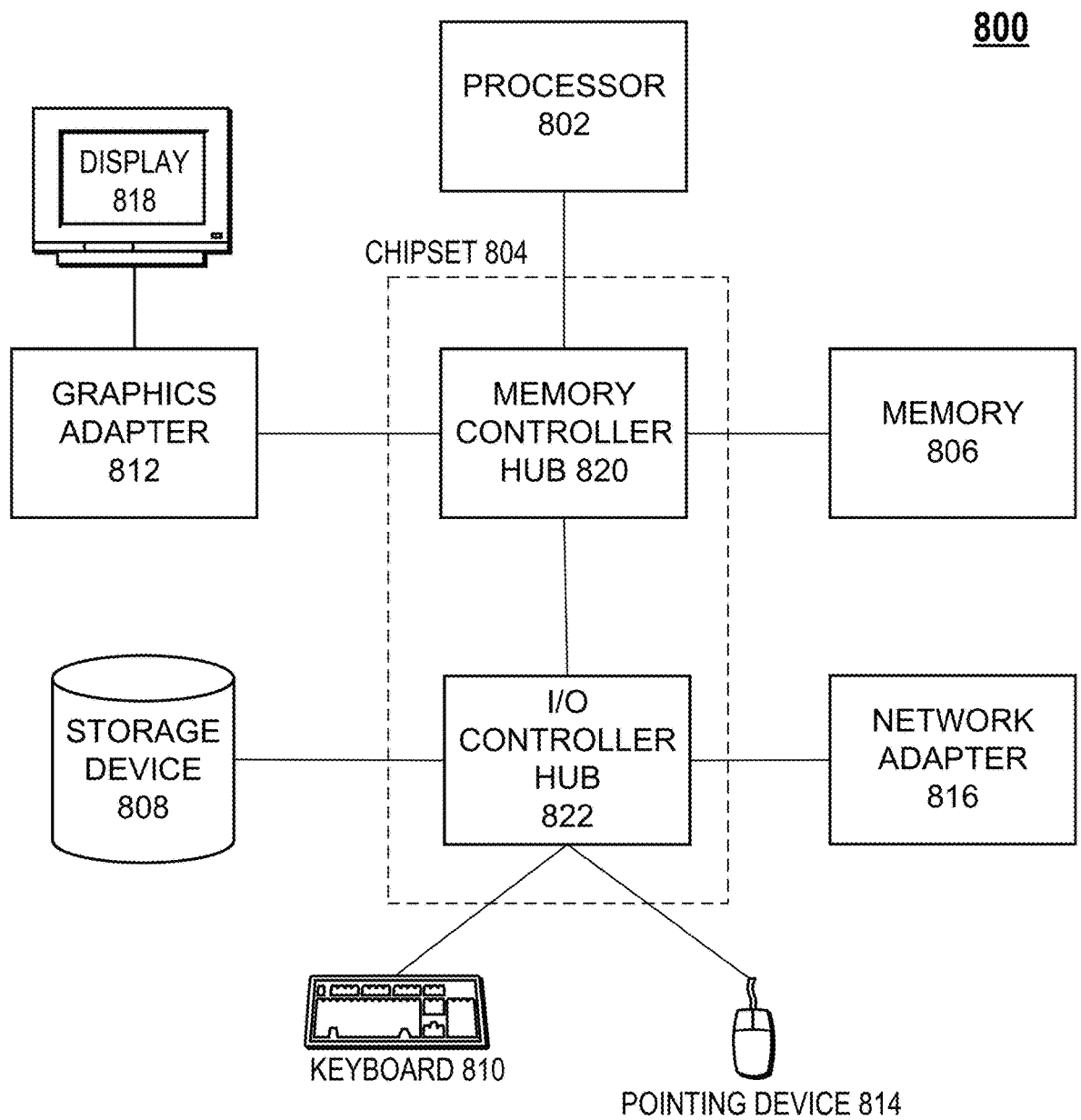
FIG. 8 is a high-level block diagram illustrating physical components of a computer used as part or all of the dialog server, the user client, the agent client, or the organization system of FIG. 1, according to some embodiments.

FIG. 8 is a high-level block diagram illustrating physical components of a computer 800 used as part or all of the dialog server 100, the user client 110, the agent client 130, or the organization system 120 from FIG. 1, according to some embodiments. Illustrated are at least one processor 802 coupled to a chipset 804. Also coupled to the chipset 804 are a memory 806, a storage device 808, a graphics adapter 812, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The graphics adapter 812 displays images and other information on the display 818. The network adapter 816 couples the computer 800 to a local or wide area network.

As is known in the art, a computer 800 can have different and/or other components than those shown in FIG. 8. In addition, the computer 800 can lack certain illustrated components. In one embodiment, a computer 800 acting as a server may lack a graphics adapter 812, and/or display 818, as well as a keyboard or pointing device. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method of visualizing dialog flow in an agent-user dialog system, the method comprising:
    segmenting text for a plurality of dialogs between an agent and a user into a plurality of conversation units;
    generating a plurality of embeddings corresponding to the plurality of conversation units by applying a pre-trained model to the conversation units of the dialogs, the pre-trained model comprising:
        a first Bi-LSTM trained to encode a conversation unit into a dense vector, and
        a second Bi-LSTM trained to generate an embedding for a set of dense vectors generated by the first Bi-LSTM,
        wherein the first Bi-LSTM and the second Bi-LSTM are trained using examples encoded using a third Bi-LSTM, the examples comprising positive examples comprising rounds of stored dialogs and negative examples comprising randomly sampled stored dialogs;
    clustering the embeddings into a plurality of embedding clusters;
    forming a dialog flow graph, wherein the embedding clusters are nodes of the dialog flow graph and edges of the dialog flow graph are formed based on transitions in the dialogs corresponding to the embeddings of the conversation units; and
    providing an interactive graphical user interface for visualizing the dialog flow graph.

2. The computer-implemented method of claim 1, wherein the plurality of conversations comprised audio conversations, and wherein the text for the plurality of conversations is obtained by applying speech-to-text algorithms to the audio conversations.

3. The computer-implemented method of claim 1, wherein the conversation units are conversation rounds, each conversation round consisting of agent text corresponding to a message of the agent to the user and user text corresponding to a response of the user to the agent.

4. The computer-implemented method of claim 1, further comprising labeling the embedding clusters with keywords obtained from textual statistics derived from text of the conversation units corresponding to the embeddings in the clusters.

5. The computer-implemented method of claim 4, wherein the keywords comprise both agent-representative keywords derived from agent utterances and user-representative keywords derived from user utterances.

6. The computer-implemented method of claim 1, wherein forming the dialog flow graph comprises, for each of a plurality of the dialogs, counting transitions between clusters corresponding to the conversation units of the dialog.

7. The computer-implemented method of claim 1, wherein the interactive graphical user interface comprises a dialog flow view portion depicting the dialog flow graph, and a cluster view portion depicting text of the conversation units corresponding to a cluster node that is currently selected within the dialog flow view.

8. The computer-implemented method of claim 7, wherein the interactive graphical user interface additionally comprises an individual dialog view portion depicting text of a dialog that contains a conversation unit that is currently selected within the cluster view.

9. A non-transitory computer-readable storage medium storing instructions that when executed by a processor perform actions comprising:
    segmenting text for a plurality of dialogs between an agent and a user into a plurality of conversation units;
    generating a plurality of embeddings corresponding to the plurality of conversation units by applying a pre-trained model to the conversation units of the dialogs, the pre-trained model comprising:
        a first Bi-LSTM trained to encode a conversation unit into a dense vector,
        a second Bi-LSTM trained to generate an embedding for a set of dense vectors generated by the first Bi-LSTM, and
        wherein the first Bi-LSTM and the second Bi-LSTM are trained using examples encoded using a third Bi-LSTM, the examples comprising positive examples comprising rounds of stored dialogs and negative examples comprising randomly sampled stored dialogs;
    clustering the embeddings into a plurality of embedding clusters;
    forming a dialog flow graph, wherein the embedding clusters are nodes of the dialog flow graph and edges of the dialog flow graph are formed based on transitions in the dialogs corresponding to the embeddings of the conversation units; and
    providing an interactive graphical user interface for visualizing the dialog flow graph.

10. The non-transitory computer-readable storage medium of claim 9, wherein the plurality of conversations comprised audio conversations, and wherein the text for the plurality of conversations is obtained by applying speech-to-text algorithms to the audio conversations.

11. The non-transitory computer-readable storage medium of claim 9, wherein the conversation units are conversation rounds, each conversation round consisting of agent text corresponding to a message of the agent to the user and user text corresponding to a response of the user to the agent.

12. The non-transitory computer-readable storage medium of claim 9, the actions further comprising labeling the embedding clusters with keywords obtained from textual statistics derived from text of the conversation units corresponding to the embeddings in the clusters.

13. The non-transitory computer-readable storage medium of claim 12, wherein the keywords comprise both agent-representative keywords derived from agent utterances and user-representative keywords derived from user utterances.

14. The non-transitory computer-readable storage medium of claim 9, wherein forming the dialog flow graph comprises, for each of a plurality of the dialogs, counting transitions between clusters corresponding to the conversation units of the dialog.

15. The non-transitory computer-readable storage medium of claim 9, wherein the interactive graphical user interface comprises a dialog flow view portion depicting the dialog flow graph, and a cluster view portion depicting text of the conversation units corresponding to a cluster node that is currently selected within the dialog flow view.

16. The non-transitory computer-readable storage medium of claim 15, wherein the interactive graphical user interface additionally comprises an individual dialog view portion depicting text of a dialog that contains a conversation unit that is currently selected within the cluster view.

17. A computer system comprising:
a computer processor; and
a non-transitory computer-readable storage medium storing instructions that when executed by the processor perform actions comprising:
segmenting text for a plurality of dialogs between an agent and a user into a plurality of conversation units;
generating a plurality of embeddings corresponding to the plurality of conversation units by applying a pre-trained model to the conversation units of the dialogs, the pre-trained model comprising:
a first Bi-LSTM trained to encode a conversation unit into a dense vector, and
a second Bi-LSTM trained to generate an embedding for a set of dense vectors generated by the first Bi-LSTM,
wherein the first Bi-LSTM and the second Bi-LSTM are trained using examples encoded using a third Bi-LSTM, the examples comprising positive examples comprising rounds of stored dialogs and negative examples comprising randomly sampled stored dialogs;
clustering the embeddings into a plurality of embedding clusters;
forming a dialog flow graph, wherein the embedding clusters are nodes of the dialog flow graph and edges of the dialog flow graph are formed based on transitions in the dialogs corresponding to the embeddings of the conversation units; and
providing an interactive graphical user interface for visualizing the dialog flow graph.

18. The computer system of claim 17, wherein the plurality of conversations comprised audio conversations, and wherein the text for the plurality of conversations is obtained by applying speech-to-text algorithms to the audio conversations.

19. The computer system of claim 17, wherein the conversation units are conversation rounds, each conversation round consisting of agent text corresponding to a message of the agent to the user and user text corresponding to a response of the user to the agent.

20. The computer system of claim 17, the actions further comprising labeling the embedding clusters with keywords obtained from textual statistics derived from text of the conversation units corresponding to the embeddings in the clusters.

\* \* \* \* \*